(12) United States Patent
Dougherty et al.

(10) Patent No.: US 9,172,067 B2
(45) Date of Patent: Oct. 27, 2015

(54) BATTERY CELL AND TERMINAL CONFIGURATION

(75) Inventors: Thomas J. Dougherty, Waukesha, WI (US); Steven J. Wood, Shorewood, WI (US); John P. Dinkelman, South Milwaukee, WI (US); Dale B. Trester, Milwaukee, WI (US); Gerald K. Bowen, Cedarburg, WI (US); Gary P. Houchin-Miller, Fox Point, WI (US)

(73) Assignee: JOHSON CONTROLS-SAFT ADVANCED POWER SOLUTIONS LLC, Wilmington, DE (US)

( * ) Notice: Subject to any disclaimer, the term of this patent is extended or adjusted under 35 U.S.C. 154(b) by 1099 days.

(21) Appl. No.: 12/497,502

(22) Filed: Jul. 2, 2009

(65) Prior Publication Data

US 2010/0003584 A1    Jan. 7, 2010

Related U.S. Application Data

(63) Continuation-in-part of application No. PCT/US2008/050624, filed on Jan. 9, 2008.

(60) Provisional application No. 60/884,151, filed on Jan. 9, 2007, provisional application No. 60/956,539, filed on Aug. 17, 2007.

(51) Int. Cl.
*H01M 2/02* (2006.01)
*H01M 2/04* (2006.01)

(52) U.S. Cl.
CPC ............ *H01M 2/021* (2013.01); *H01M 2/0404* (2013.01); *H01M 2/0426* (2013.01); *Y10T 29/49108* (2015.01)

(58) Field of Classification Search
USPC ......... 429/163, 174, 178, 179, 181, 177, 186, 429/211, 161, 65, 82, 53, 57, 72, 94
See application file for complete search history.

(56) References Cited

U.S. PATENT DOCUMENTS

| | | | |
|---|---|---|---|
| 5,521,021 A | 5/1996 | Alexandres et al. | |
| 6,245,464 B1 | 6/2001 | Spillman et al. | |
| 6,737,192 B2 * | 5/2004 | Yabuki et al. | 429/178 |
| 2005/0174092 A1 * | 8/2005 | Dougherty et al. | 320/128 |
| 2006/0115727 A1 * | 6/2006 | Kim et al. | 429/181 |
| 2006/0269836 A1 * | 11/2006 | Yamamoto et al. | 429/159 |
| 2007/0026296 A1 * | 2/2007 | Byun et al. | 429/72 |
| 2007/0026307 A1 | 2/2007 | Kim | |

OTHER PUBLICATIONS

Extended European Search Report for European Application No. 08727482.5, date of mailing Jan. 11, 2011, 3 pages.
International Search Report and Written Opinion for International Application No. PCT/US2008/50624, date of mailing Jun. 27, 2008, 7 pages.

* cited by examiner

*Primary Examiner* — Raymond Alejandro
(74) *Attorney, Agent, or Firm* — Foley & Lardner LLP

(57) ABSTRACT

An electrochemical cell includes a can having a first end and a second end and a first element provided within the can and including an electrode. The cell also includes a first terminal integrally formed as a part of the can and extending from one of the first or second ends. The cell further includes a terminal assembly directly coupled to the first element and including a stud configured to act as a second terminal. The first end includes a boss that defines an aperture through which the stud extends, wherein the boss at least partially surrounds the stud and a bushing coupled to the stud.

21 Claims, 12 Drawing Sheets

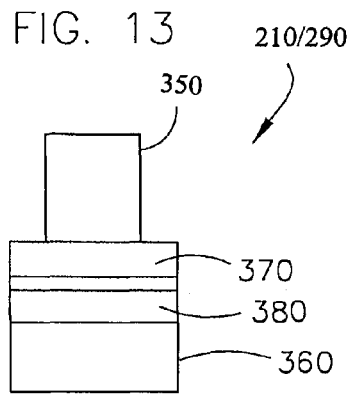
FIG. 13
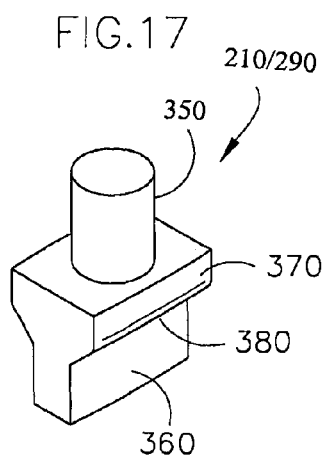
FIG. 17
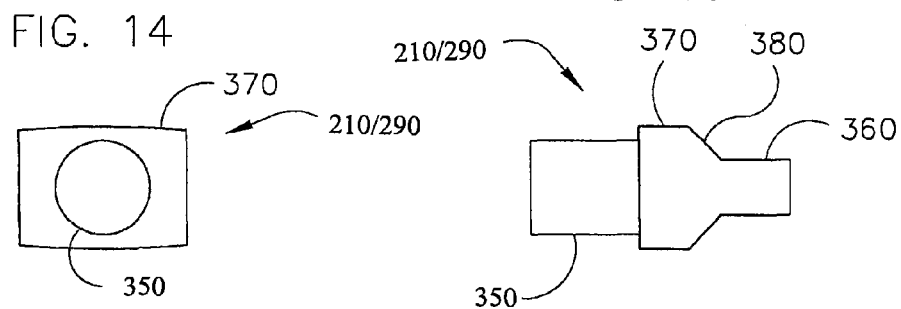
FIG. 14
FIG. 15
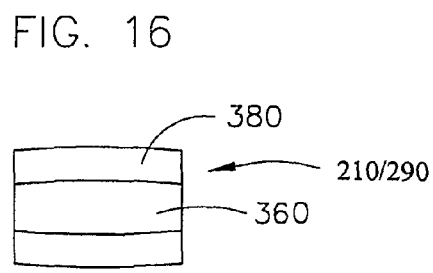
FIG. 16
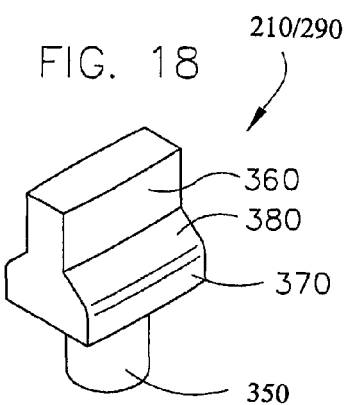
FIG. 18

BATTERY CELL AND TERMINAL CONFIGURATION

CROSS-REFERENCE TO RELATED PATENT APPLICATIONS

This application is a Continuation-in-Part of International Patent Application No. PCT/US2008/050624, filed Jan. 9, 2008, which claims the benefit of and priority to U.S. Provisional Patent Application No. 60/884,151, filed Jan. 9, 2007, and U.S. Provisional Patent Application No. 60/956,539, filed Aug. 17, 2007. The entire disclosures of International Patent Application No. PCT/US2008/050624, U.S. Provisional Patent Application No. 60/884,151, and U.S. Provisional Patent Application No. 60/956,539 are incorporated herein by reference.

BACKGROUND

The present disclosure relates to the field of batteries and battery systems. More specifically, the present disclosure relates to batteries or cells (e.g., lithium-ion batteries).

It is known to provide batteries or cells for use in vehicles such as automobiles. For example, lead-acid batteries have been used in starting, lighting, and ignition applications. More recently, hybrid electric vehicles are being developed which utilize a battery (e.g., a lithium-ion or nickel-metal-hydride battery) in combination with other systems (e.g., an internal combustion engine) to provide power for the vehicle.

It is known that a battery generally includes multiple terminals (e.g., a positive terminal and a negative terminal, etc.) through which the battery is electrically connected to other batteries or other components. A battery may have terminals that protrude from the battery surface. These terminals are provided as separate elements that are coupled to other battery components (e.g., by welding to a battery cover). This adds to the manufacturing process, as well as increases cost. The integrity of such coupling mechanisms may also present issues over the life of the battery.

It is known to provide a battery that generally includes a jellyroll connected to the terminals by intermediate members (e.g., terminal tabs). Connecting the terminals in this fashion adds to the manufacturing process, as well as increases costs. Terminal tabs also increase current resistance. It would be advantageous to eliminate the need for such terminal tabs to remove the additional components and manufacturing costs and time associated with such components (e.g., to reduce the number of parts in the battery and to eliminate the need to handle and assemble the components during manufacturing), to reduce resistance, and generally improve the conductive connection between the jellyroll and the terminals.

It is known to weld various battery components utilizing conventional welding techniques. However, such welds are not highly resistant to vibration, or environmentally friendly. Such welds can also make it difficult to introduce electrolyte into a battery cell. Certain welds also require the use of additional materials such as metallic plating. It would be advantageous to eliminate the use of such conventional welds in favor of non-conventional welds (e.g. sonic welds) to obtain a superior connection, superior pull-out strength, higher resistance to vibration and an efficient and repeatable process that is environmentally friendly. Such non-conventional welds also leave fill paths between electrode layers to allow electrolyte to be more easily introduced into the battery cell, and eliminate the need for intermediate material such as metallic plating.

Accordingly, it would be advantageous to provide a battery cell that includes one or more terminals that are integrally formed with the body or cover of the battery. It would also be advantageous to directly conductively couple the terminals to the jellyroll utilizing non-conventional welds such as sonic welds.

SUMMARY

An exemplary embodiment relates to an electrochemical cell that includes a can having a first end and a second end and a first element provided within the can and including an electrode. The cell also includes a first terminal integrally formed as a part of the can and extending from one of the first or second ends. The cell further includes a terminal assembly directly coupled to the first element and including a stud configured to act as a second terminal. The first end includes a boss that defines an aperture through which the stud extends, wherein the boss at least partially surrounds the stud and a bushing coupled to the stud.

Another exemplary embodiment relates to an electrochemical cell that includes a can having a first end comprising a first terminal and a second terminal extending therefrom. The electrochemical cell also includes a first element comprising at least one electrode provided in the can and conductively coupled to the first terminal, the first terminal extending through an aperture defined by a boss extending from the first end of the can, the boss at least partially surrounding the first terminal and an insulative member configured to electrically isolate the first terminal from the can. The electrochemical cell further includes a second element provided in the can and conductively coupled to the second terminal.

Another exemplary embodiment relates to a method of manufacturing an electrochemical cell that includes welding a terminal assembly to an element that comprises at least one electrode and providing a bushing in contact with the terminal assembly. The method also includes inserting the bushing and at least a portion of the terminal assembly through an opening formed in a first end of a can, the opening defined by a boss integrally formed with and extending from the first end of the can. The bushing acts to isolate the terminal assembly from the boss.

BRIEF DESCRIPTION OF THE DRAWINGS

The accompanying drawings, which are incorporated in and constitute a part of the specification, illustrate embodiments of the invention and together with the detailed description given below, serve to explain the principles of the invention.

FIG. 13 is a front view of an exemplary embodiment of a terminal assembly.

FIG. 14 is a top view of an exemplary embodiment of a terminal assembly.

FIG. 15 is a side view of an exemplary embodiment of a terminal assembly.

FIG. 16 is a bottom view of an exemplary embodiment of a terminal assembly.

FIG. 17 is a first isometric view of an exemplary embodiment of a terminal assembly.

FIG. 18 is a second isometric view of an exemplary embodiment of a terminal assembly.

DETAILED DESCRIPTION

For the purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members, or the two members and any additional intermediate members being attached, connected or otherwise joined to one another. Such joining may be permanent in nature or may be removable or releasable in nature.

Figure 1:
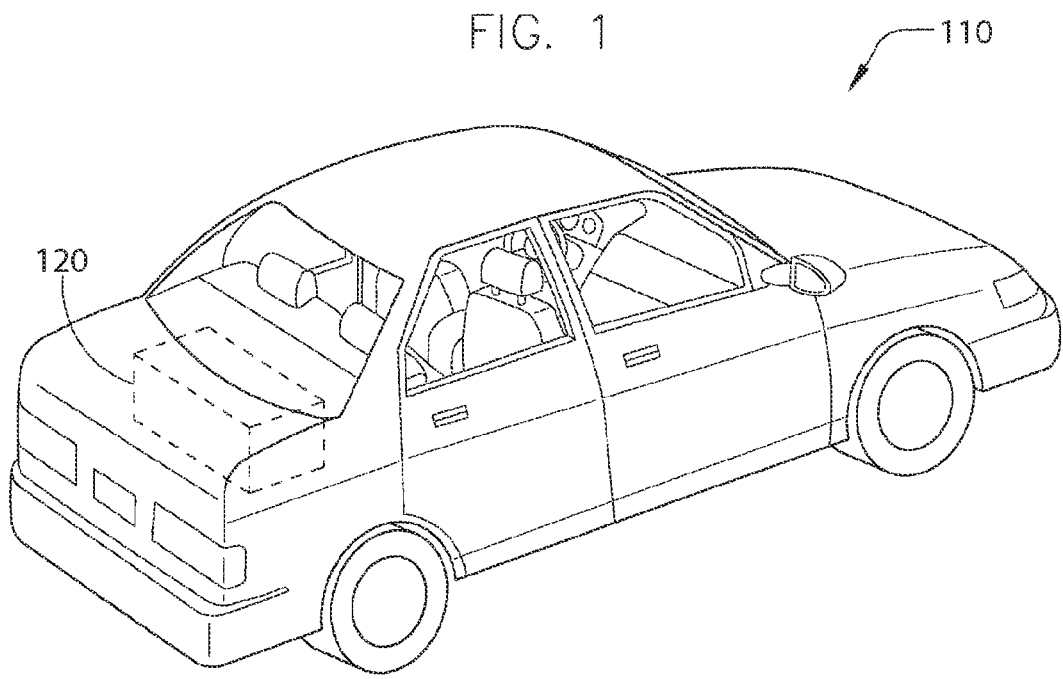
FIG. 1 is a perspective view of a vehicle including a battery module according to an exemplary embodiment.

Referring to FIG. 1, a vehicle 110 is shown according to an exemplary embodiment and includes a battery module 120. Size, shape, configuration and location of battery module 120 and the type of vehicle 110 may vary according to various exemplary embodiments. For example, while vehicle 110 is shown as an automobile, according to various exemplary embodiments, the vehicle may comprise a wide variety of different types of vehicles, including, among others, motorcycles, buses, recreational vehicles, boats and the like. According to an exemplary embodiment, vehicle 110 is a hybrid vehicle or electric vehicle.

Figure 2:
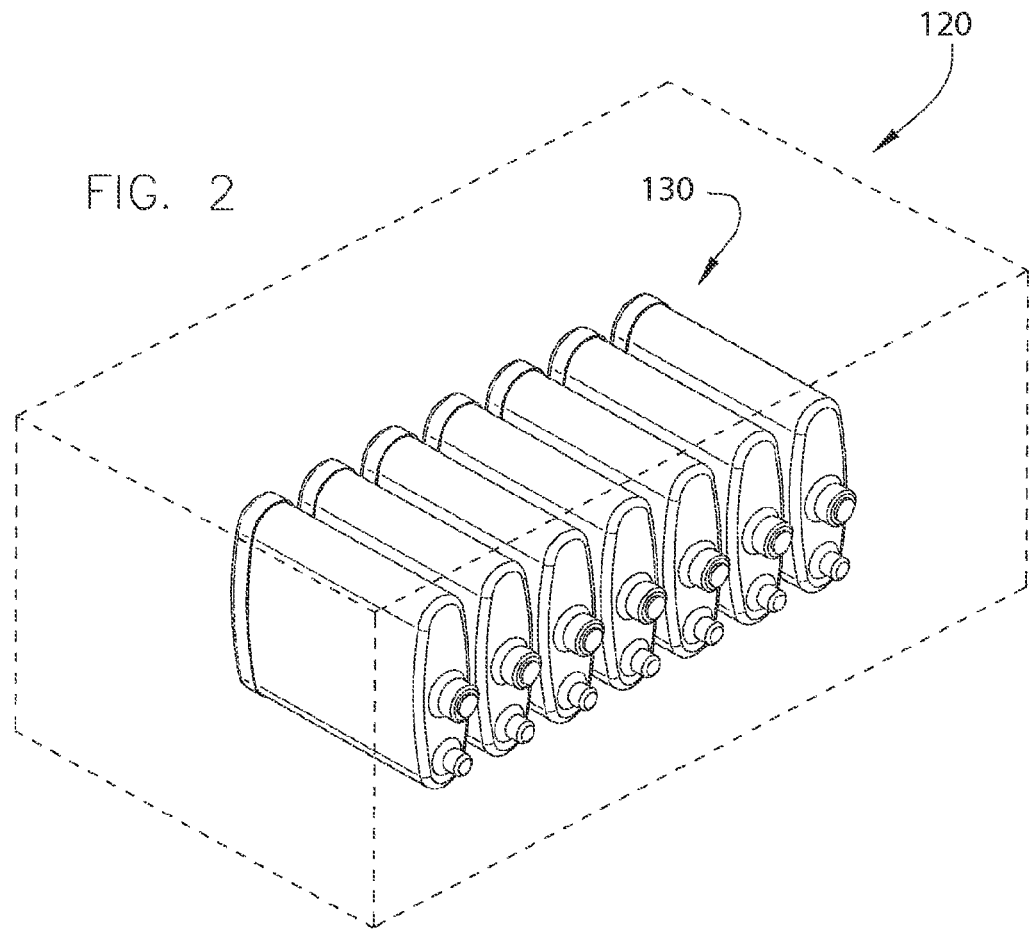
FIG. 2 is an isometric view of a battery module according to an exemplary embodiment.
Figure 3:
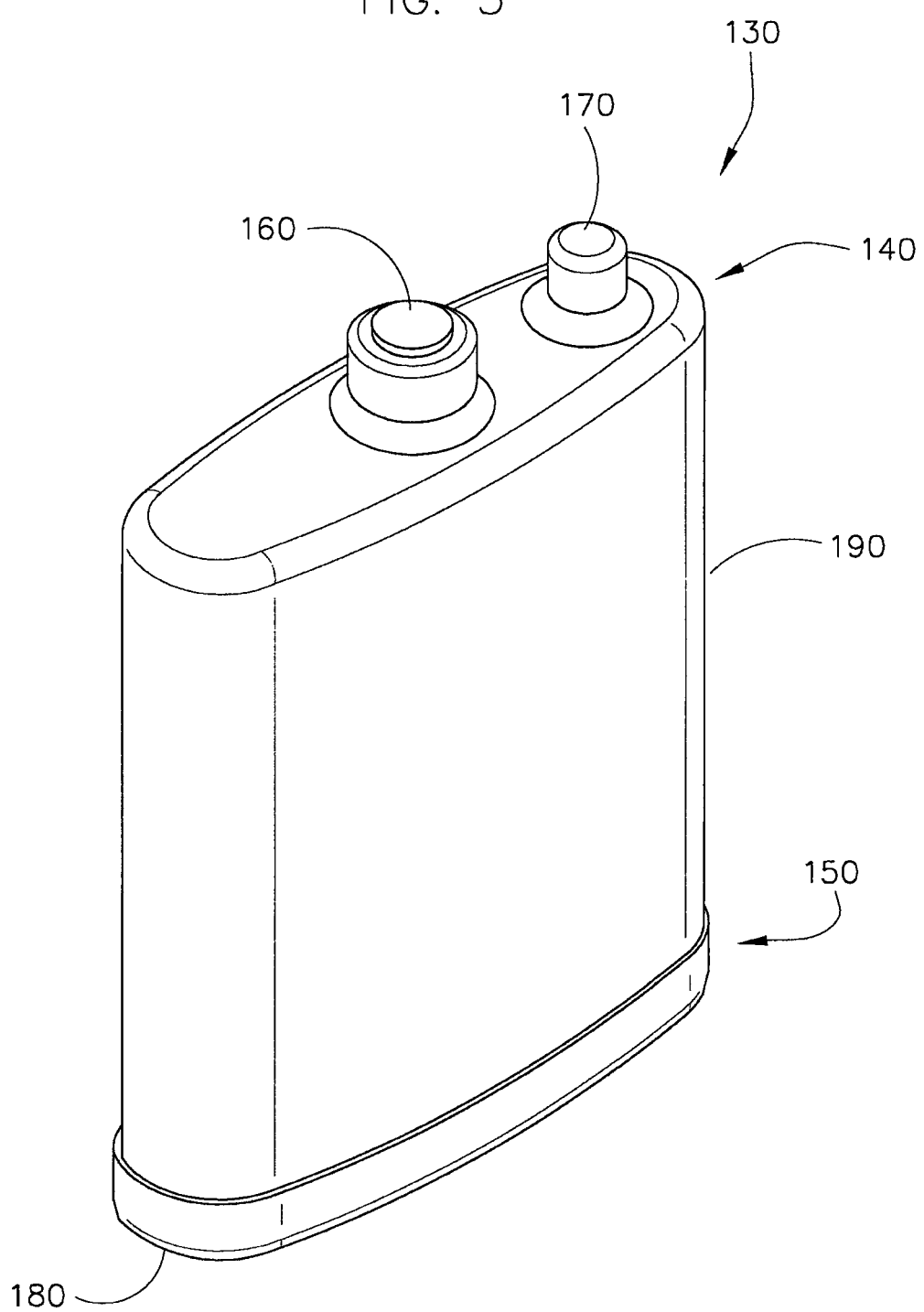
FIG. 3 is an isometric view of an exemplary embodiment of a battery cell.

Referring to FIG. 2, a battery module 120 is shown according to an exemplary embodiment. Battery module 120 includes one or more electrochemical cells or batteries, shown as battery cells 130 (e.g., lithium-ion batteries, NiMH, lithium polymer batteries, etc.). Each battery cell 130 may be positioned within a housing that may include features of a battery system such as a battery management system, cooling fan, plenum assembly, etc. Other battery module configurations may be used in accordance with various other exemplary embodiments.

Shown in FIGS. 3-7 is a first exemplary embodiment of a battery cell 130 including a first end 140 and a second end 150, and a first terminal post 160 and a terminal stud 170 positioned substantially near first end 140 of battery cell 130.

In various embodiments, battery cell 130 is an oval cell. The battery cell may also be a round cell or other suitable configuration. In various embodiments, battery cell 130 is a lithium-ion cell. The battery cell may be a lithium-polymer cell. In various embodiments, the battery cell includes a suitable lithium-containing film. For example, in various exemplary embodiments, the film includes $LiMnO_2$, $LiFePO_4$ or $LiCoO_2$. In various embodiments, the lithium-containing film is 50-1000 μm in thickness, and more preferably 150 μm. In various embodiments, e.g., for high power designs, the lithium-containing film is approximately 50-100 μm in thickness. The lithium-containing film may be made using a wet or dry manufacturing process. In various embodiments, battery cell 130 is capable of having a fully-charged voltage of 0-5 volts.

In exemplary embodiments, battery cell 130 includes a first terminal post 160, a lid 180, and a can 190 that includes terminal stud 170. Can 190 and lid 180 may be constructed from any number of suitable materials. Preferably, the can and lid are each constructed from one or more conductive materials including, without limitation, aluminum, aluminum alloy, steel, steel alloy, titanium or titanium alloy. It should be appreciated, however, that the can and lid do not need to be constructed of identical or similar materials. In various embodiments, the lid may be constructed of one or more non-conductive materials.

In one embodiment, battery cell 130 includes a first wound element 200 conductively coupled to a first terminal assembly 210. In one exemplary embodiment, first wound element 200 includes conductive foils such as metallic foils. For example, in one exemplary embodiment, first wound element 200 includes one or more copper foils and first terminal post 160 is negatively charged.

Figure 4:
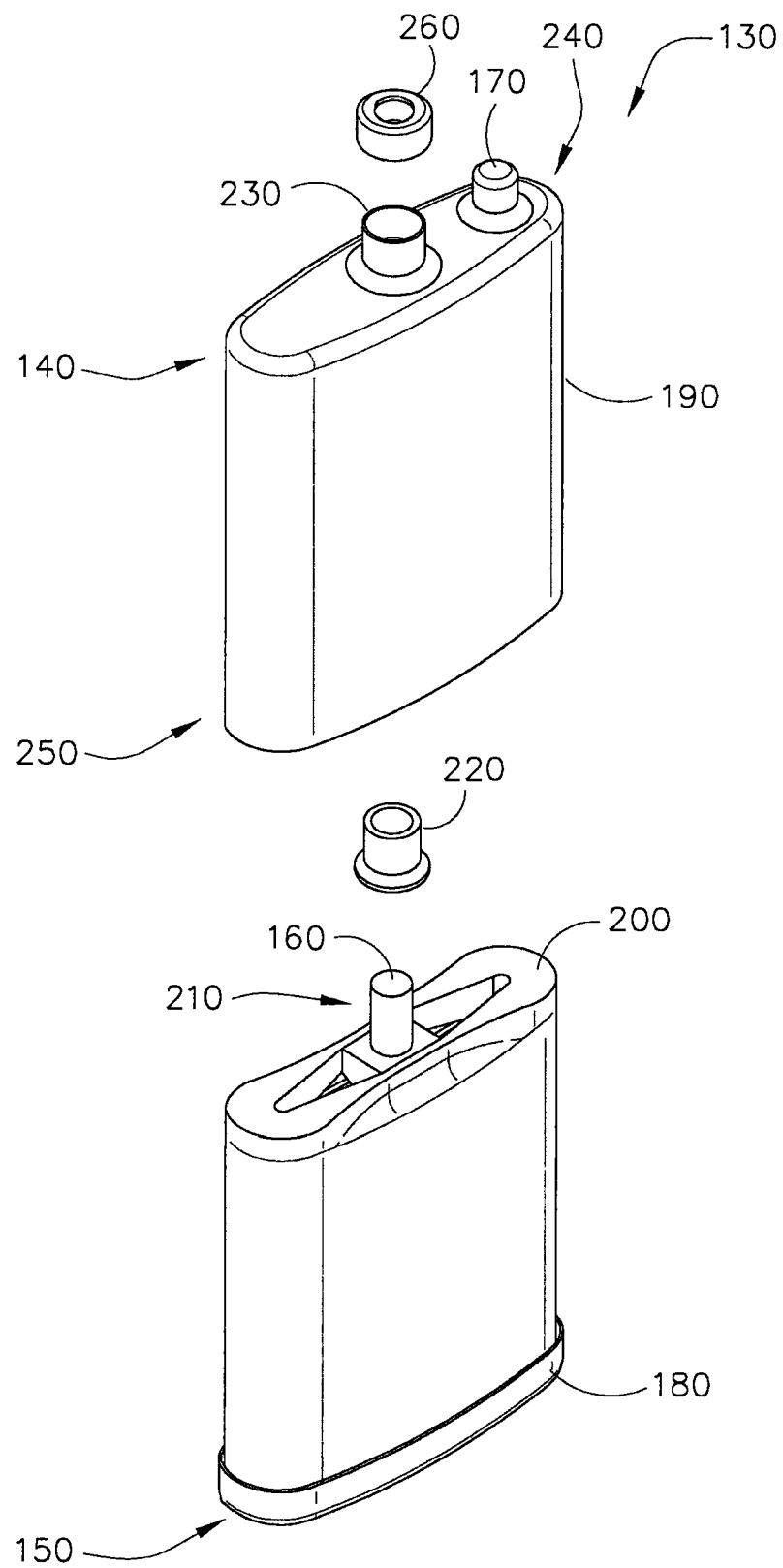
FIG. 4 is a partially exploded isometric view of an exemplary embodiment of a battery cell.
Figure 5:
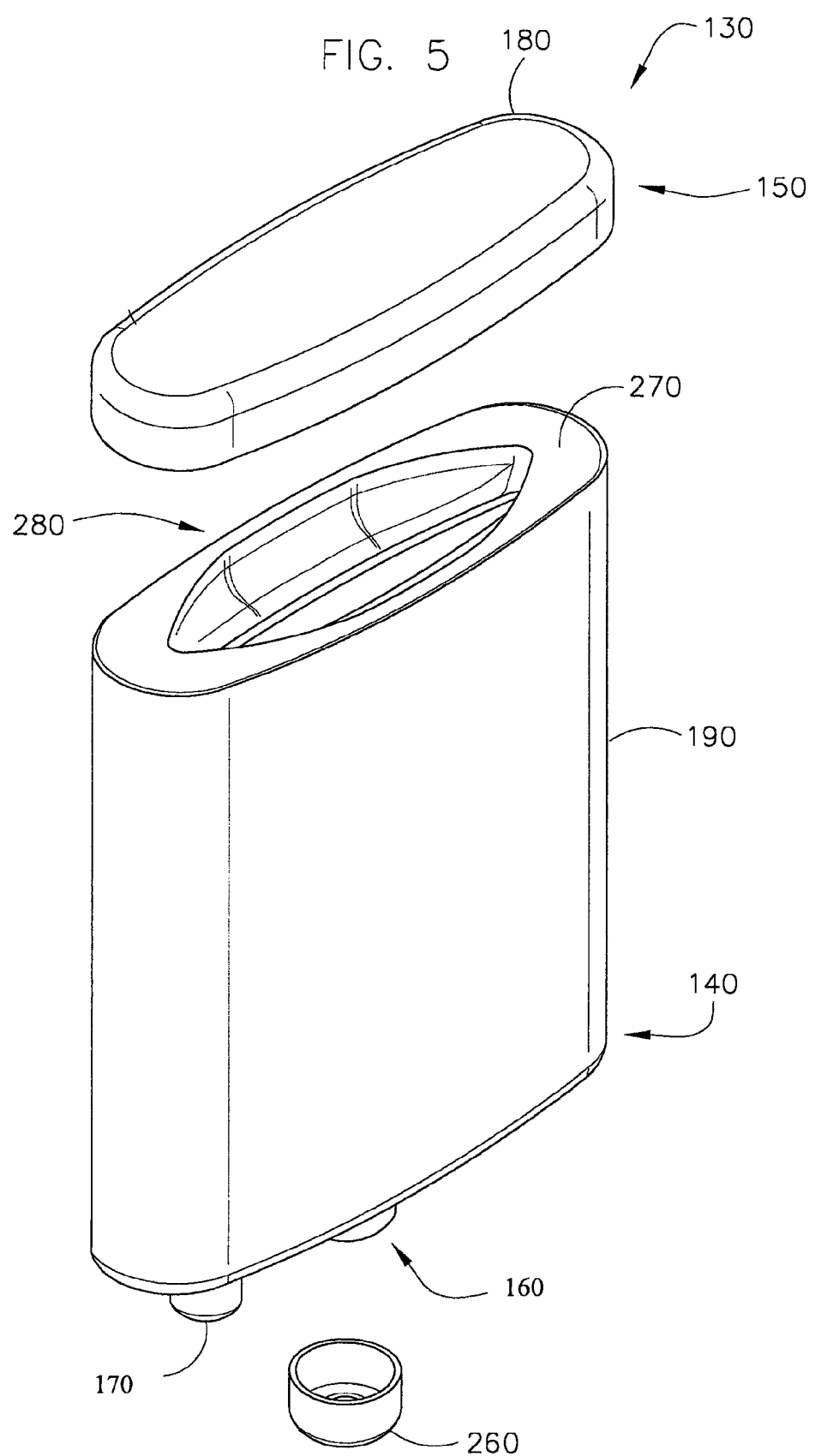
FIG. 5 is a partially exploded isometric view of an exemplary embodiment of a battery cell.
Figure 6:
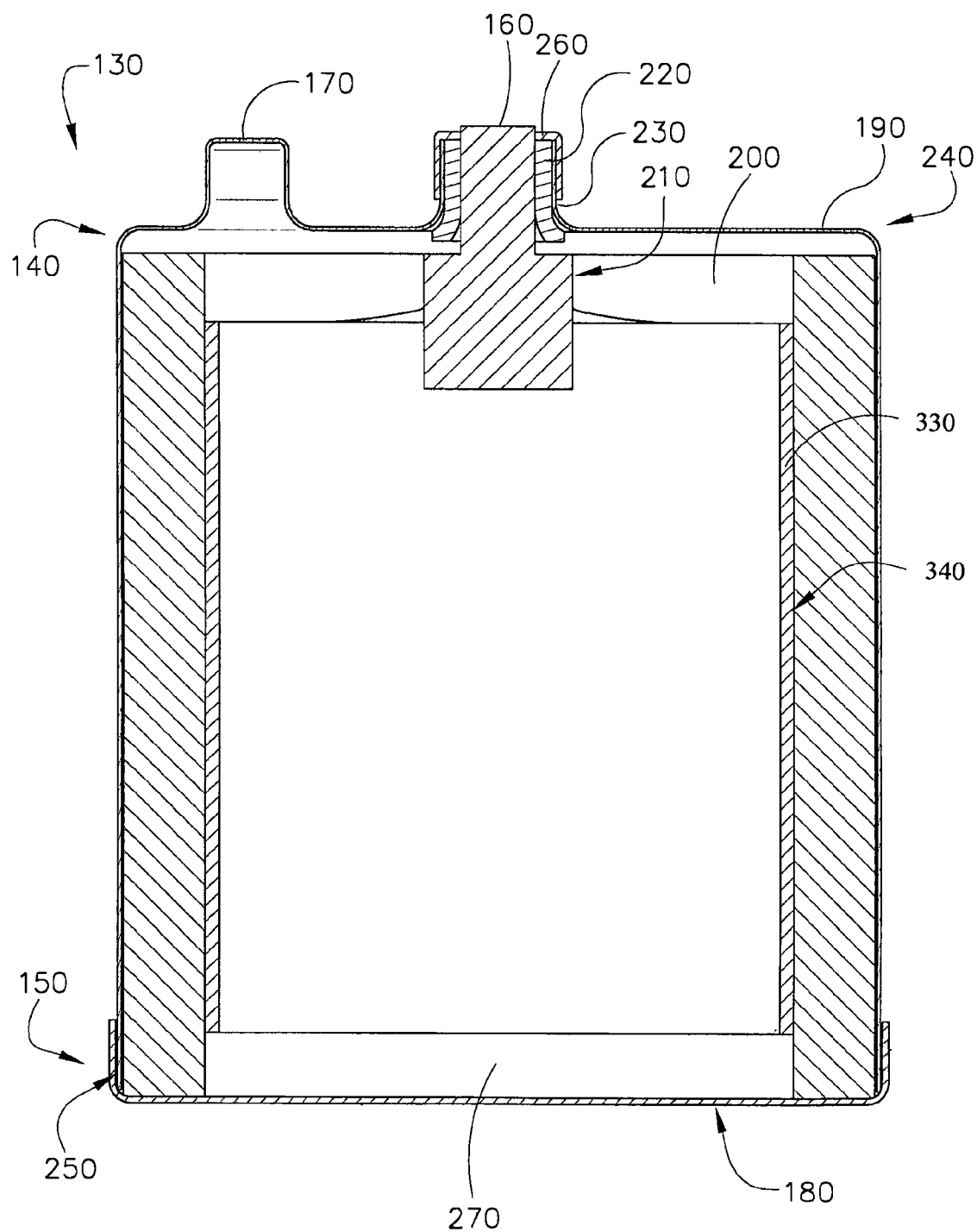
FIG. 6 is a first cross-sectional view of an exemplary embodiment of a battery cell.
Figure 7:
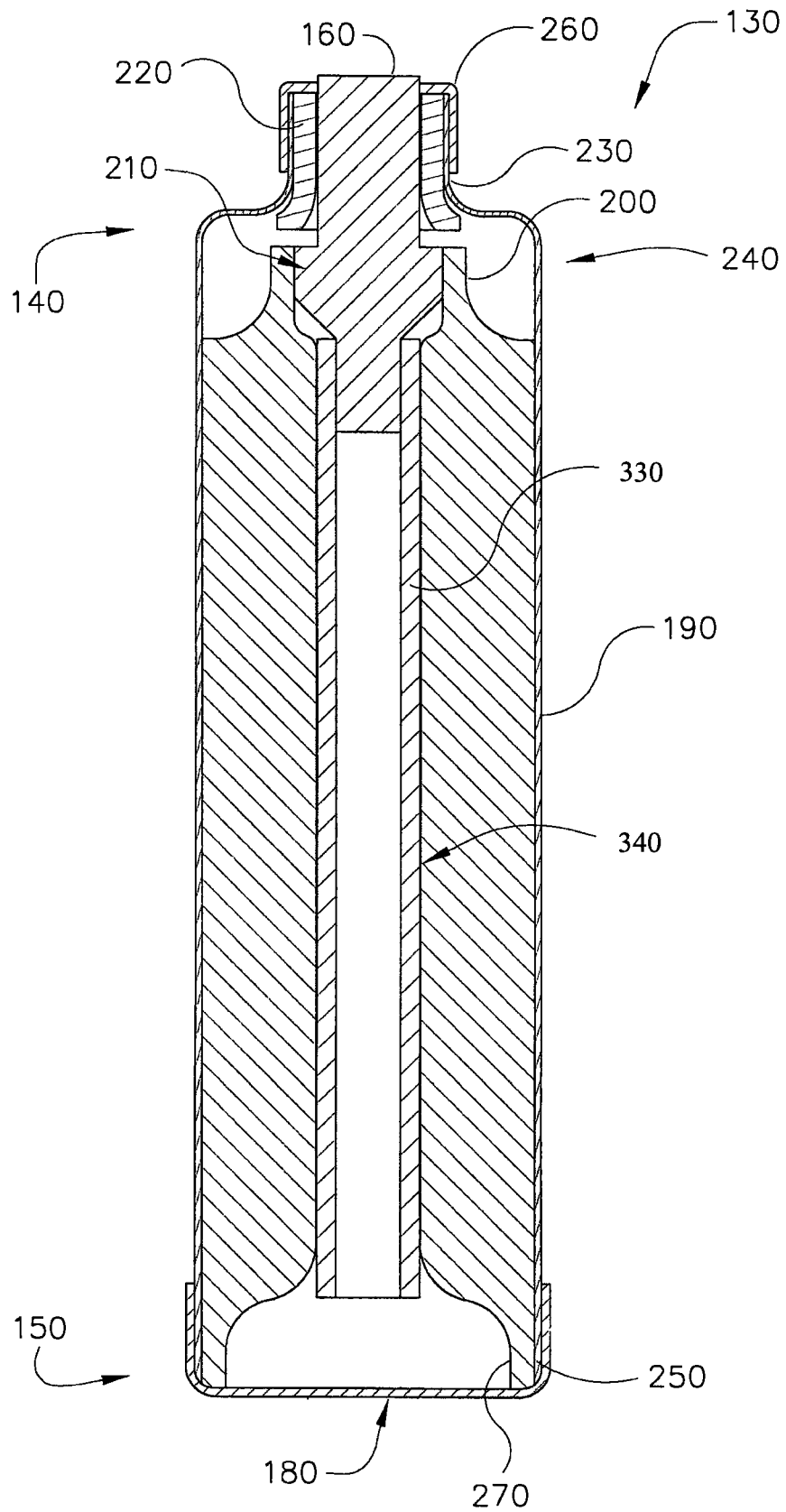
FIG. 7 is a second cross-sectional view of an exemplary embodiment of a battery cell.
Figure 8:
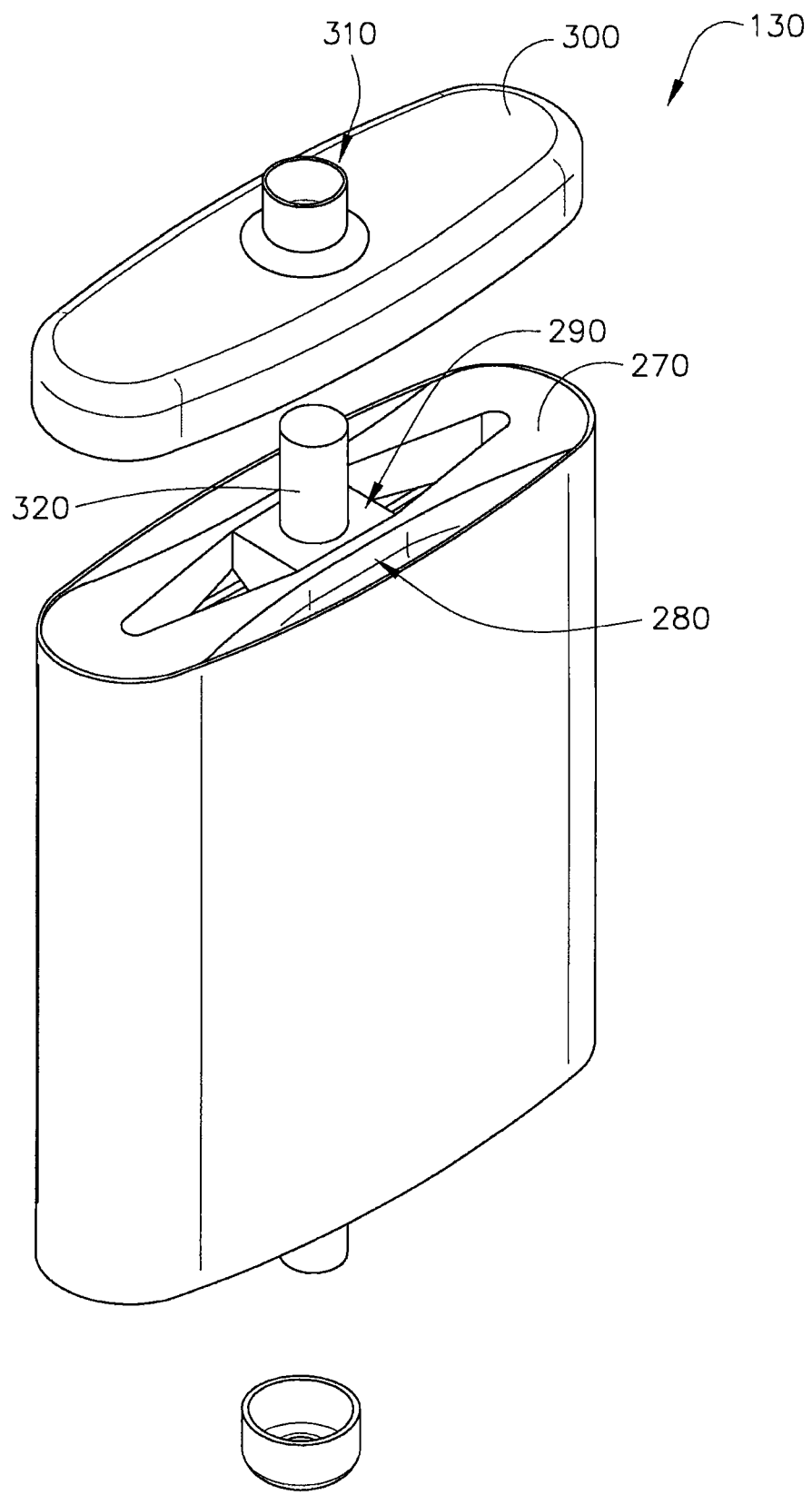
FIG. 8 is a partially exploded isometric view of a second exemplary embodiment of a battery cell.
Figure 9:
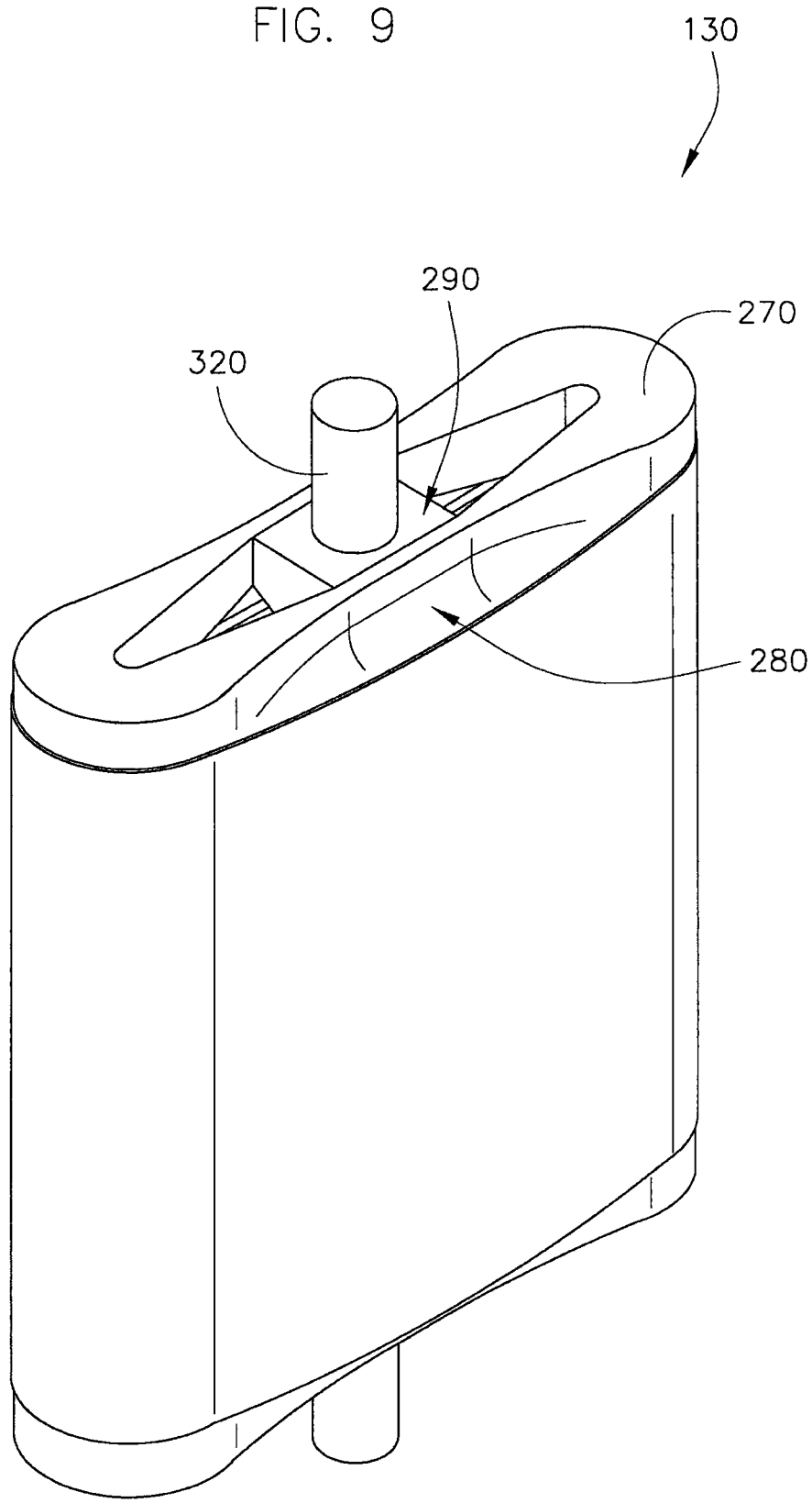
FIG. 9 is an isometric view of a second exemplary embodiment of an electrode assembly.
Figure 10:
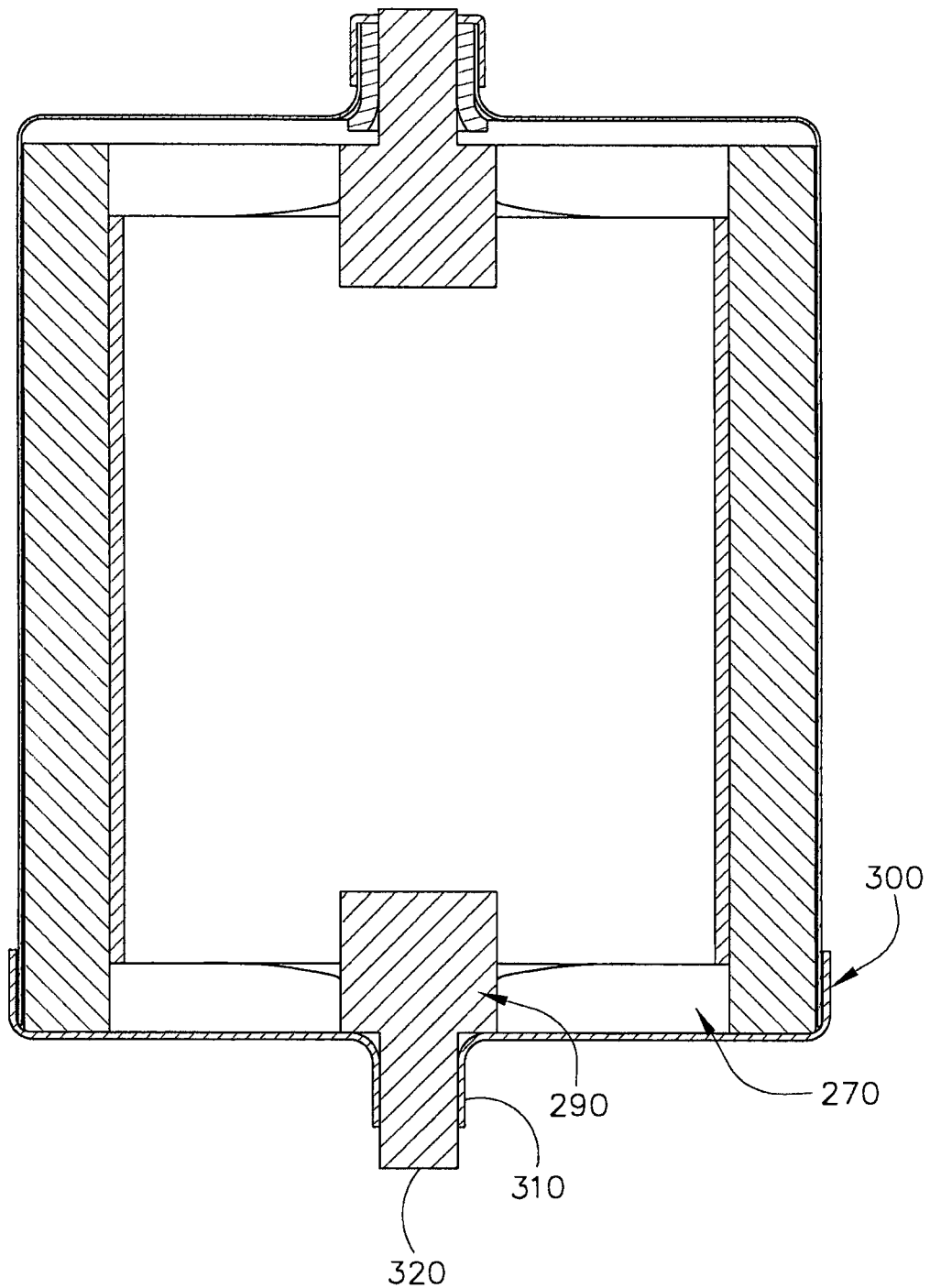
FIG. 10 is a first cross-sectional view of a second exemplary embodiment of a battery cell.
Figure 11:
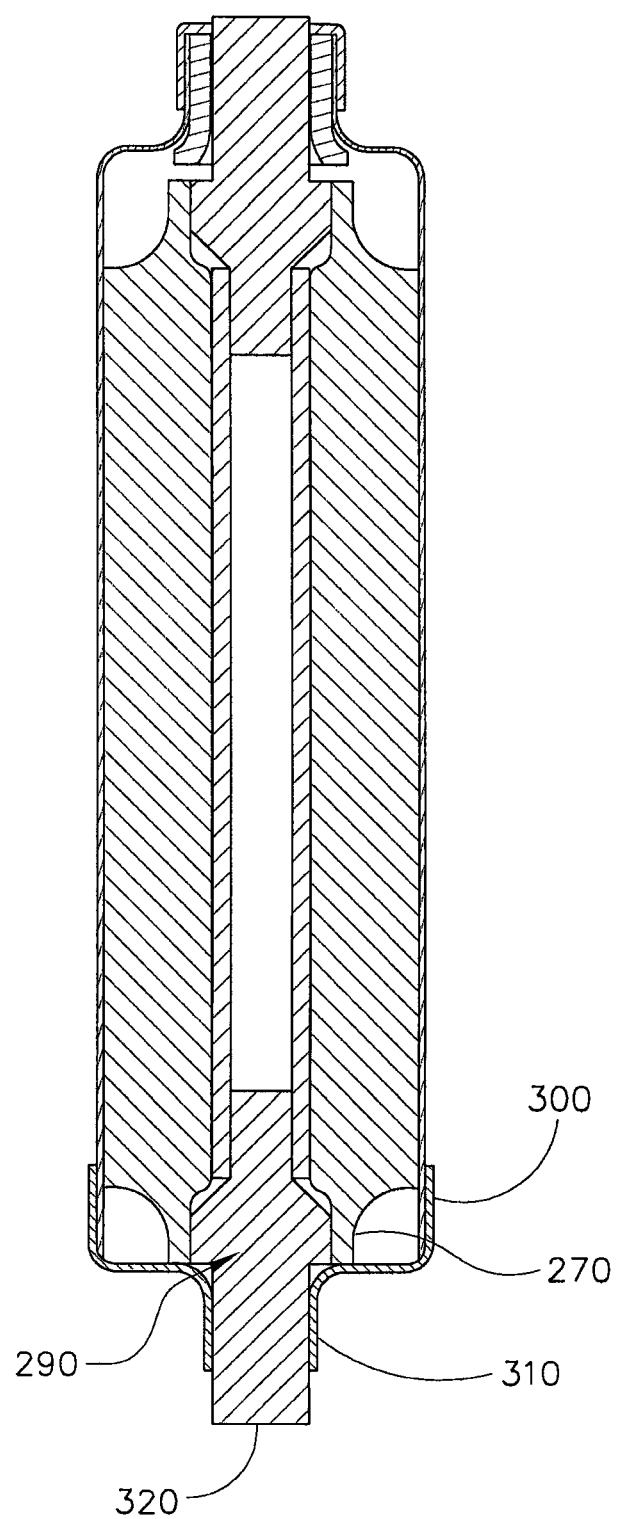
FIG. 11 is a second cross-sectional view of a second exemplary embodiment of a battery cell.

In various embodiments, first wound element 200 is at least partially conductively coupled to first terminal assembly 210. In one exemplary embodiment, first wound element 200 is sonically welded to first terminal assembly 210. In one exemplary embodiment, and as shown in FIG. 4, first wound element 200 is sonically welded on opposing sides of first terminal assembly 210. However, the first wound element may be sonically welded to the first terminal assembly in one or more locations. In addition, the first wound element may be conductively and/or mechanically coupled to the first terminal assembly in a variety of other suitable ways including laser welding, or other more conventional welding techniques.

In various exemplary embodiments, a bushing 220 at least partially surrounds the perimeter of first terminal post 160. In one embodiment, bushing 220 is configured and positioned to substantially insulate at least the first terminal post 160 from can 190 during and/or after assembly of battery cell 130. In various embodiments, bushing 220 is also configured to at least partially insulate other components of the first terminal assembly 210 and/or first wound element 200 from can 190. The bushing may be constructed of any material with suitable insulating properties. In one exemplary embodiment, bushing 220 is constructed substantially of rubber.

In various embodiments, terminal stud 170 and an aperture 230 are provided substantially at the first end 240 of can 190. In one exemplary embodiment, aperture 230 is at least partially defined by a generally cylindrical body (e.g., a boss) that extends from first end 240 of can 190. However, aperture 230 may be any suitable shape. In one exemplary embodiment, can 190 and aperture 230 are collectively provided around a number of components of battery cell 130 including at least a portion of first terminal assembly 210, including a portion of first terminal post 160, and at least a portion of bushing 220 such that at least a portion of first terminal assembly 210 and bushing 220 are at least partially surrounded by aperture 230. In various embodiments, lid 180 is configured to substantially envelope margins of a second end 250 of can 190.

The battery cell may include at least one additional terminal post, terminal stud and/or aperture (e.g., a boss). For example, a second boss may be provided at the first end of the can, and configured to at least partially surround a second bushing and a second terminal post. In one embodiment, the first terminal post and the second terminal post are similarly charged. For example, the first terminal post and second terminal post may both be negative terminals. In one embodiment, a second terminal stud provided at the first end of the can and the first terminal stud are similarly charged. For example, the first terminal stud and the second terminal stud may be positive.

In one embodiment, battery cell 130 also includes an insulator 260 configured to fit substantially around at least a portion of aperture 230. The insulator may be constructed of any material with suitable insulating properties. In one exemplary embodiment, insulator 260 comprises a polymer or plastic.

In one embodiment, battery cell 130 also includes a second wound element 270. In one exemplary embodiment, second wound element 270 includes conductive foils such as metallic foils. For example, in one exemplary embodiment, second wound element 270 includes aluminum foils. In one embodiment, second wound element 270 is conductively coupled directly to can 190. In one exemplary embodiment, a welding area 280 of second wound element 270 is sonically welded to can 190 near second end 250 of can 190. However, the second wound element may be conductively coupled to the can in any number of locations in any suitable way, e.g., by laser welding.

Referring to FIGS. 8-11, in a second exemplary embodiment, second wound element 270 is conductively coupled to a second terminal assembly 290. In one exemplary embodiment, at least welding area 280 of second wound element 270 is sonically welded to second terminal assembly 290. However, the second wound element may be conductively coupled to the second terminal assembly in any number of locations in any suitable way, e.g., by laser welding. In such second exemplary embodiments, battery cell 130 may include a lid 300. In various embodiments, lid 300 defines a lid aperture 310. In one exemplary embodiment, lid 300 and lid aperture 310 are collectively provided around a number of components of battery cell 130 including at least a portion of second terminal assembly 290, with the lid aperture provided substantially around a perimeter of a second terminal post 320 of second terminal assembly 290.

In various embodiments, the second terminal assembly and/or the second terminal post extending through the lid aperture are at least partially surrounded by an insulated member. In one embodiment, the lid aperture includes a boss or collar that may be crimped, pressed, tightened and/or shrunk against the insulating member and/or second terminal assembly to help couple the second terminal assembly to the lid.

The can and the lid may comprise any variety of configurations. The lid may be relatively shallow in depth relative to the can. In various embodiments, the lid may have one or more relatively longer sides. In various exemplary embodiments, the lid is configured to at least partially envelope a cross-sectional perimeter of the can. In various embodiments, one or more of the sides of the can may overlap one or more of the sides of the lid. In various embodiments, one or more of the sides of the can may be configured to abut one or more of the sides of the lid.

The can and the lid may be coupled in any number of suitable ways. In various exemplary embodiments, at least a portion of the lid may be heated to expansion, fit over a cross-sectional perimeter of the can, and then allowed to cool and shrink to help create a seal between the can and the lid. In various embodiments, the lid may be welded to the can. For example, one or more portions of the lid may be laser welded or sonically welded to one or more portions of the can.

Other materials may be utilized to couple the lid to the can. For example, an adhesive or epoxy may used to couple the lid to the can. In exemplary embodiments, an adhesive or epoxy that is heat-deactivated, e.g., weakened by the influence of a heat source, is utilized to help couple the lid to the can.

In various embodiments, plastic may be utilized to couple the lid to the can. For example, at least the second end of the can may be formed, coated, or otherwise at least partially covered with a plastic. For example, the second end of the can may be dipped in a plastic and/or a plastic (e.g., tape) may be at least partially wrapped around the can substantially near the second end of the can. In one embodiment, the lid may be heated to expansion and fit over a cross-sectional perimeter of the can covered or coated with plastic. In one embodiment, the heated lid may help to at least partially melt the plastic as the plastic comes into proximity to the lid. As the lid and/or plastic cool, the plastic helps create a seal between the can and the lid. Any variety of plastic materials may be used to help at least partially seal the can and the lid. For example, the plastic material may comprise a polyethylene or other ethylene material or a polyolefin material.

Referring to FIGS. 3-12, in various embodiments, the battery cell includes at least one pressure release system to help vent gases and/or relieve pressure as and/or after the battery cell begins to fail or otherwise malfunction. In various embodiments, the pressure release system is also configured to cut the battery cell from a current path of a battery module comprising the battery cell without substantially disrupting the current path of the battery module.

In various embodiments, the seal between the can and the lid helps relieve and/or release pressure. For example, as the battery cell fails or otherwise malfunctions, at least a portion of the battery cell may realize an elevation in temperature and/or internal pressure. In one embodiment, the increase in battery cell temperature and/or pressure helps cause the seal between the lid and can to at least partially deteriorate and/or the lid and can to at least partially separate. Such a pressure release system may allow pressurized gases inside the battery cell to escape.

In one embodiment, the pressure release system may also be configured to interface with a bus bar to disrupt a current path of the battery cell without significantly interrupting the current path of a battery module comprising the battery cell. For example, in various embodiments, the lid includes a collar. The battery cell and bus bar may be relatively positioned such that, when the lid moves relative to the can, the collar is moved into a knife/blade connection on the bus bar to cut the current path of the battery cell without significantly disrupting the current path of the battery module comprising the battery cell.

In various embodiments, the can includes a weakened area designed to rupture if and when pressure inside the battery cell reaches a certain level. For example, a portion of a side or the first end of the can and/or second end of the can may have a reduced thickness to help the can rupture more easily to relieve and/or release pressure inside the battery cell when it reaches a certain level. According to various embodiments, the weakened area may be provided by scoring or any other suitable methods of weakening a portion of the can, or may be a separate material provided in the can.

In various embodiments, the weakened area may help disrupt the current path to the battery cell. For example, the weakened area may be located substantially around the second terminal post of the battery cell such that a pressure condition resulting in a rupture causes the second terminal post to conductively and/or mechanically separate from the battery cell such that the battery cell is cut out of the current path of the battery module comprising the battery cell without substantially disrupting the current path of the battery module.

Figure 12:
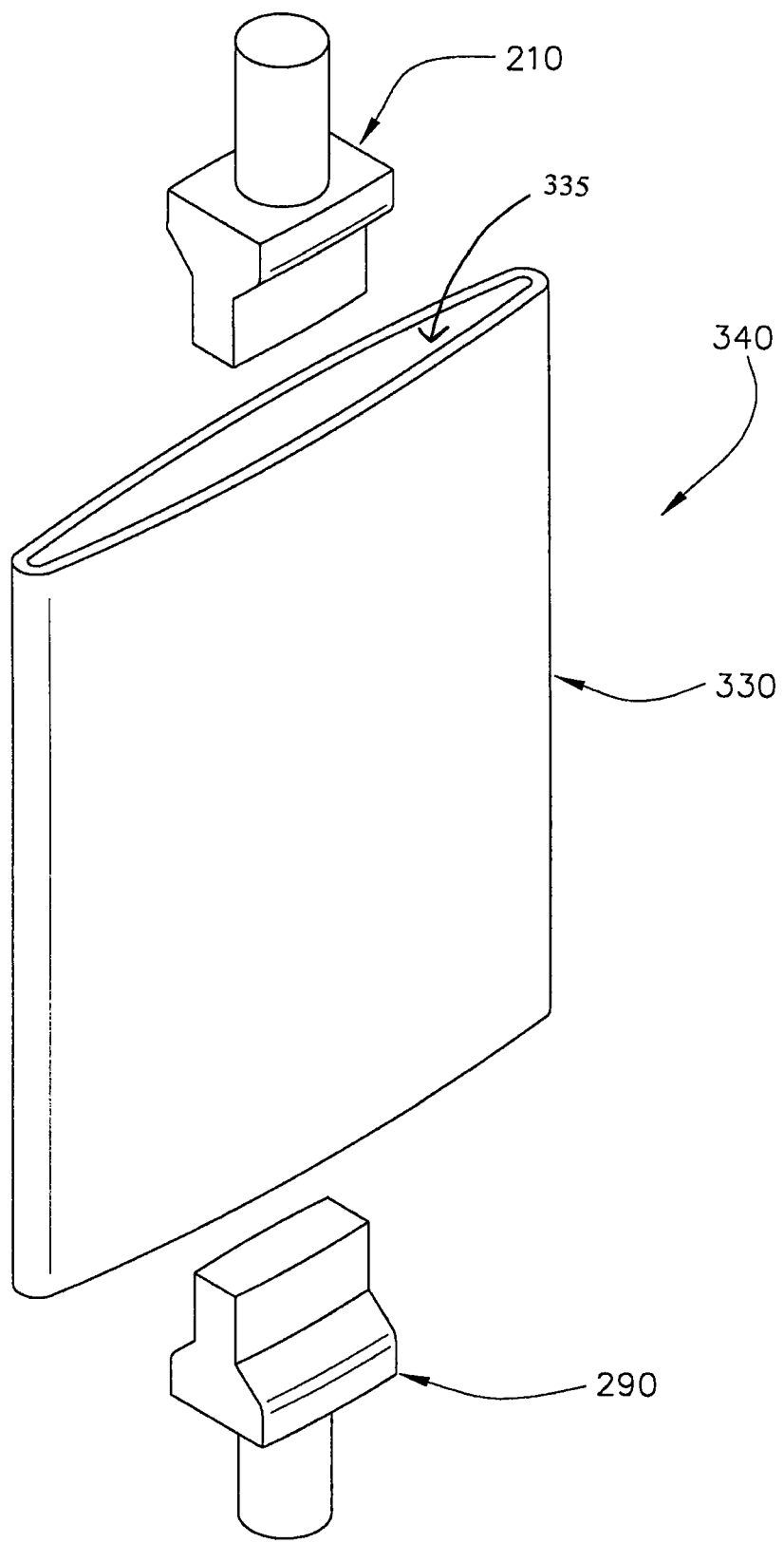
FIG. 12 is a partially exploded isometric view of an exemplary embodiment of a mandrel assembly.

Referring to FIG. 12, in various embodiments, at least first terminal assembly 210 is associated with a mandrel 330 to produce a mandrel assembly 340. In various embodiments, mandrel 330 is constructed or formed of a plastic material. In various embodiments, at least a portion of mandrel 330 defines at least one opening 335 that is configured to receive at least a portion of at least first terminal assembly 210. For example, first terminal assembly 210 may be at least partially inserted into opening 335. In various embodiments, second terminal assembly 290 is at least partially inserted into opening 335 or another opening. While FIG. 12 shows first and second terminal assemblies 210/290 positioned at opposing ends of mandrel 330, it should be appreciated that the mandrel may be operatively connected with any number of terminal assemblies, and multiple terminal assemblies including the first and second terminal assemblies may be positioned at or substantially near the same end of the mandrel.

Each terminal assembly may be operatively connected to the mandrel in any number of suitable ways. For example, each terminal assembly may be inserted into the aperture and molded, glued, heat-sealed, and/or otherwise coupled to the mandrel.

In various embodiments, the mandrel assembly is placed on a winding machine (not shown). In various embodiments, electrodes included in the first wound element and at least one separator (not shown) are wound around mandrel 330 such that at least a portion of the first wound element overlaps at least a portion of first terminal assembly 210. In various embodiments, at least a portion of the first wound element is conductively coupled to first terminal assembly 210. In various exemplary embodiments, at least a portion of first wound element is sonically welded to first terminal assembly 210 at 20-40 kHz.

In various embodiments, at least a portion of the first wound element and the second wound element is wrapped or otherwise covered with a sheath (not shown) to produce an electrode assembly. The sheath may be a shrink wrap or other insulating material such as polypropylene, polyethylene, green tape or any other material with suitable insulating qualities. In various embodiments, the bushing is provided around the first terminal post, the electrode assembly is inserted into a heated can such that at least a portion of the first terminal post passes through the boss or other opening in the can provided therefor. In one embodiment, the can and the boss are heated to approximately 100 degrees Celsius and allowed to cool after insertion of the electrode assembly into the can. As the can and the boss cool, the can and the boss are allowed to contract around at least a portion of the electrode assembly.

For ease of assembly, in one embodiment, a screw tap may be releasably connected to the first terminal post. For example, a screw tap may be inserted into an end of the first terminal post. The screw tap may then be utilized to help pull the electrode assembly into the can, and/or the first terminal post, into the boss and/or other opening provided therefor.

In various embodiments, at least a portion of the second wound element is conductively coupled to the can. In various embodiments, at least a portion of the second wound element is sonically welded to the can at 20-40 kHz. In one embodiment, electrolyte is inserted into the can or otherwise introduced to the electrode assembly and the lid is used to at least partially enclose the second end of the can. The electrolyte may also be inserted into the can after the lid is utilized to at least partially enclose the second end of the can. For example, the lid and/or the can may include a fill port.

In various embodiments, much of the battery cell assembly may be performed at one machine, and less floor space is needed to assemble the battery cell. In addition, in various embodiments, multiple battery cells may be conductively and/or mechanically coupled together with swedged collars surrounding a positive terminal apparatus from one battery cell and a negative terminal apparatus from another battery cell.

Referring to FIGS. 13-18, in various embodiments, the battery cell includes at least one terminal assembly, such as first terminal assembly 210 and/or second terminal assembly 290. At least one of the first and second terminal assemblies 210/290 includes a stud 350, a welding surface 360, and a terminal post 370. In various embodiments, welding surface 360 is configured for insertion into a mandrel. In one embodiment, the cross-section of welding surface 360 is generally rectangular. However, it is contemplated that the welding surface may be configured of any suitable geometric shapes including, without limitation, a trapezoidal or cylindrical shape. In one embodiment, each terminal assembly 210/290 is a single member. However, each terminal assembly 210/290 may include a plurality of members when desired, e.g., where it is desirable to use less material.

In one embodiment, terminal post 370 is connected to the welding surface 360. In various embodiments, welding surface 360 is configured to provide a surface to which at least a portion of a wound element may be mechanically and/or conductively coupled.

In various embodiments, welding surface 360 extends substantially laterally from terminal post 370. For example, in an embodiment where the terminal assembly is inserted into the mandrel, at least a portion of the welding surface may abut the mandrel to help prevent movement of the terminal assembly relative to the mandrel. In various embodiments, the welding surface extends laterally from the terminal post to a position substantially aligned with a center layer of at least one wound element.

In various embodiments, welding surface 360 is configured to overlap a margin of the mandrel. In various embodiments, welding surface 360 may extend beyond the margin of the mandrel and into one or more wound elements. In various embodiments, the one or more terminal assemblies may be operatively associated with the mandrel while electrodes are wound around the mandrel. In various embodiments, one or more portions of the electrodes may then be conductively coupled to each terminal assembly. For example, the electrodes may be laser, friction and/or induction welded to each terminal assembly.

In one embodiment, terminal post 370 is coupled to stud 350. In various embodiments, stud 350 is configured to provide an external terminal for a battery cell. The stud may be any suitable geometric shape. In various embodiments, the stud is a bar or round stock. For example, stud 350 in FIGS. 13-18 is shown as a smooth cylindrical post. In various embodiments, the stud is a blade, a threaded post or another suitable configuration. The stud may be coupled to terminal post 370 in any number of ways. For example, in one embodiment, the stud is spun welded to the terminal post.

In various embodiments, as shown in FIGS. 13-18, terminal assembly 210/290 also includes one or more tapered portions 380. In one embodiment, one or more tapered portions 380 connect terminal post 370 to welding surface 360. In one embodiment, tapered portion 380 includes one or more sides inclined from one or more sides of terminal post 370 to one or more sides of welding surface 360. In various embodiments, tapered portion 380 is inclined or otherwise configured to help prevent damage to one or more of the electrodes of the wound elements. Tapered portion 380 may also improve the connection between the mandrel and terminal assembly 210/290 and/or between one or more wound elements and terminal assemblies 210/290. Welding surface 360, terminal post 370, and/or tapered portion 380 may be coupled in any variety of suitable ways. For example, welding surface 360, terminal post 370, and/or tapered portion 380 may be a stamped piece.

In various embodiments, each terminal assembly 210/290 is constructed or otherwise formed of conductive material such as aluminum, copper, and/or an alloy comprising aluminum and/or copper. For example, the second terminal assembly may be constructed of aluminum and/or an aluminum alloy such as AlMg3, and the first terminal assembly may be constructed of copper and/or a copper alloy such as C110.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It is also important to note that the construction and arrangement of the battery cell as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., the can and the terminal stud), the position of elements may be reversed or otherwise varied (e.g., the first terminal assembly and the second terminal assembly), and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. An electrochemical cell comprising:
   a can having a first end and a second end, the can being a single, continuous structure comprising a planar surface at the first end, a first protrusion extending away from the planar surface, and a second protrusion extending away from the planar surface;
   a first element provided within the can and including an electrode; and
   a terminal assembly directly coupled to the first element and including a stud configured to act as a first terminal of the electrochemical cell; and
   a lid coupled to the second end of the can, the lid at least partially enveloping a perimeter of the second end of the can and sealing an opening that extends across an entire width of the second end of the can;
   wherein the first protrusion forms a boss that defines an aperture through which the stud extends from inside the can, wherein the boss at least partially surrounds the stud and a bushing coupled to the stud; and
   wherein the second protrusion does not include an aperture and is configured to act as a second terminal of the electrochemical cell.

2. The electrochemical cell of claim 1, wherein the first element is a wound element.

3. The electrochemical cell of claim 1, wherein the electrochemical cell comprises a pressure release system configured to release pressure inside the electrochemical cell when the pressure reaches a predetermined level.

4. The electrochemical cell of claim 1, wherein the lid is coupled to the second end of the can with plastic material.

5. The electrochemical cell of claim 4, wherein the plastic material is configured to create a seal between the can and the lid.

6. The electrochemical cell of claim 1, wherein the first element is conductively coupled to the terminal assembly by a sonic weld.

7. The electrochemical cell of claim 1, wherein the can has an oval shape.

8. The electrochemical cell of claim 1, wherein the boss is located generally in the center of the first end of the can.

9. The electrochemical cell of claim 1, wherein the bushing is configured to insulate the second terminal from the can.

10. The electrochemical cell of claim 1, wherein the first protrusion and the second protrusion each define a cavity therein.

11. An electrochemical cell comprising:
    a can, the can being a single, continuous structure comprising a planar surface at a first end thereof, an opening at a second end thereof, a first protrusion extending away from the planar surface, and a second protrusion extending away from the planar surface;
    a first element comprising at least one electrode provided in the can and conductively coupled to a first terminal, the first terminal extending from inside the can through an aperture defined by the first protrusion, the first protrusion at least partially surrounding the first terminal and an insulative member configured to electrically isolate the first terminal from the can;
    a second element provided in the can and conductively coupled to a second terminal, the second protrusion forming the second terminal and not having an aperture; and
    a lid coupled to the second end of the can, the lid at least partially enveloping a perimeter of the second end of the can and sealing the opening, the opening extending across an entire width of the second end of the can.

12. The electrochemical cell of claim 11, wherein the first element is directly conductively coupled to the first terminal.

13. The electrochemical cell of claim 11, wherein the first element is directly conductively coupled to the first terminal by a weld.

14. The electrochemical cell of claim 11, wherein the first element is a wound element.

15. The electrochemical cell of claim 11, wherein the can has an oval shape.

16. The electrochemical cell of claim 11, wherein the first protrusion is located generally in the center of the first end of the can.

17. The electrochemical cell of claim 11, wherein the electrochemical cell comprises a pressure release system configured to release pressure inside the electrochemical cell when the pressure reaches a predetermined level.

18. An electrochemical cell comprising:
a can having a first end and a second end opposite the first end, the can being a single, continuous structure comprising a planar surface at the first end thereof, a first protrusion extending away from the planar surface, and a second protrusion extending away from the planar surface, and the can being configured to contain a first element comprising a first electrode, the first protrusion comprising an aperture;
a terminal assembly conductively coupled to the first element and comprising a stud extending from inside the can through the aperture of the first protrusion, the stud electrically insulated from the can and configured to act as a first terminal; and
a lid coupled to the second end of the can, the lid at least partially enveloping a perimeter of the second end of the can and sealing an opening that extends across an entire width of the second end of the can;
wherein the second protrusion does not include an aperture and forms a second terminal.

19. The electrochemical cell of claim 18, wherein the electrochemical cell comprises a pressure release system configured to release pressure inside the electrochemical cell when the pressure reaches a predetermined level.

20. The electrochemical cell of claim 18, wherein the lid is coupled to the second end of the can with a plastic material.

21. The electrochemical cell of claim 20, wherein the plastic material is configured to create a seal between the can and the lid.

* * * * *